United States Patent [19]

Marisetty

[11] Patent Number: 5,590,312

[45] Date of Patent: Dec. 31, 1996

[54] METHOD AND APPARATUS FOR EMULATING CIRCUITRY IN A COMPUTER SYSTEM USING A SYSTEM MANAGEMENT INTERRUPT

[75] Inventor: Suresh K. Marisetty, San Jose, Calif.

[73] Assignee: Intel Corporation, Santa Clara, Calif.

[21] Appl. No.: 265,502

[22] Filed: Jun. 24, 1994

Related U.S. Application Data

[63] Continuation of Ser. No. 987,199, Dec. 7, 1992, abandoned.

[51] Int. Cl.⁶ .................................................. G06F 9/46
[52] U.S. Cl. ................................... 395/500; 395/733
[58] Field of Search .................................. 395/500, 700, 395/733, 800

[56] References Cited

U.S. PATENT DOCUMENTS

| | | | |
|---|---|---|---|
| 3,938,101 | 2/1976 | Lewis et al. | 395/500 |
| 4,084,235 | 4/1978 | Hirtle et al. | 395/500 |
| 4,450,519 | 5/1984 | Guttag et al. | 395/800 |
| 4,514,805 | 4/1985 | McDonough et al. | 395/734 |
| 4,727,480 | 2/1988 | Albright et al. | 395/500 |
| 4,812,975 | 3/1989 | Adachi et al. | 395/500 |
| 4,841,476 | 6/1989 | Mitchell et al. | 395/500 |
| 4,875,186 | 10/1989 | Blume | 395/500 |
| 4,885,681 | 12/1989 | Umeno et al. | 395/700 |
| 4,907,150 | 3/1990 | Arroyo et al. | 395/575 |
| 4,972,317 | 11/1990 | Bounomo et al. | 395/375 |
| 5,031,119 | 7/1991 | Dulaney et al. | 395/161 |
| 5,155,838 | 10/1992 | Kishi | 395/500 |
| 5,245,321 | 9/1993 | Franz | 345/172 |
| 5,255,379 | 10/1993 | Melo | 395/412 |
| 5,297,124 | 3/1994 | Plotkin et al. | 369/32 |
| 5,297,282 | 3/1994 | Meilak et al. | 395/700 |
| 5,303,378 | 4/1994 | Cohen | 395/700 |
| 5,367,658 | 11/1994 | Spear et al. | 395/490 |

OTHER PUBLICATIONS

Tanenbaum, "Structured Computer Organization", Prentice–Hall 1984, p. 10–12.

*Primary Examiner*—Parshotam S. Lall
*Assistant Examiner*—Viet Vu
*Attorney, Agent, or Firm*—Blakely, Sokoloff, Taylor & Zafman

[57] ABSTRACT

A method and apparatus for emulating circuitry in a computer system is described. The method and apparatus includes a method and apparatus for determining when the circuit is to be accessed. Furthermore, in the currently preferred embodiment, the present invention includes a method and apparatus for trapping the address and data of the access. The present invention also includes a method and apparatus for generating an interrupt transparently indicating to the computer system that the circuitry is being accessed. The present invention also includes a method and apparatus for handling the interrupt and emulating the function of the circuitry. In the currently preferred embodiment, the method and apparatus for emulating comprises a software routine.

8 Claims, 3 Drawing Sheets

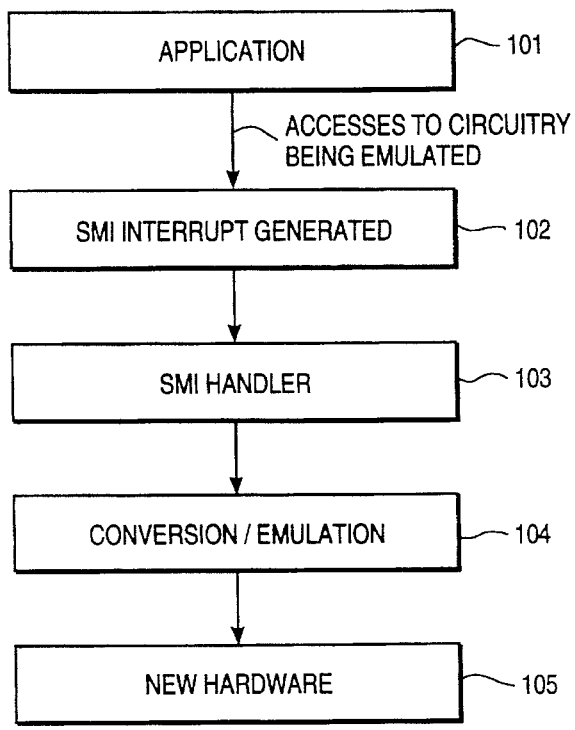
FIG_1
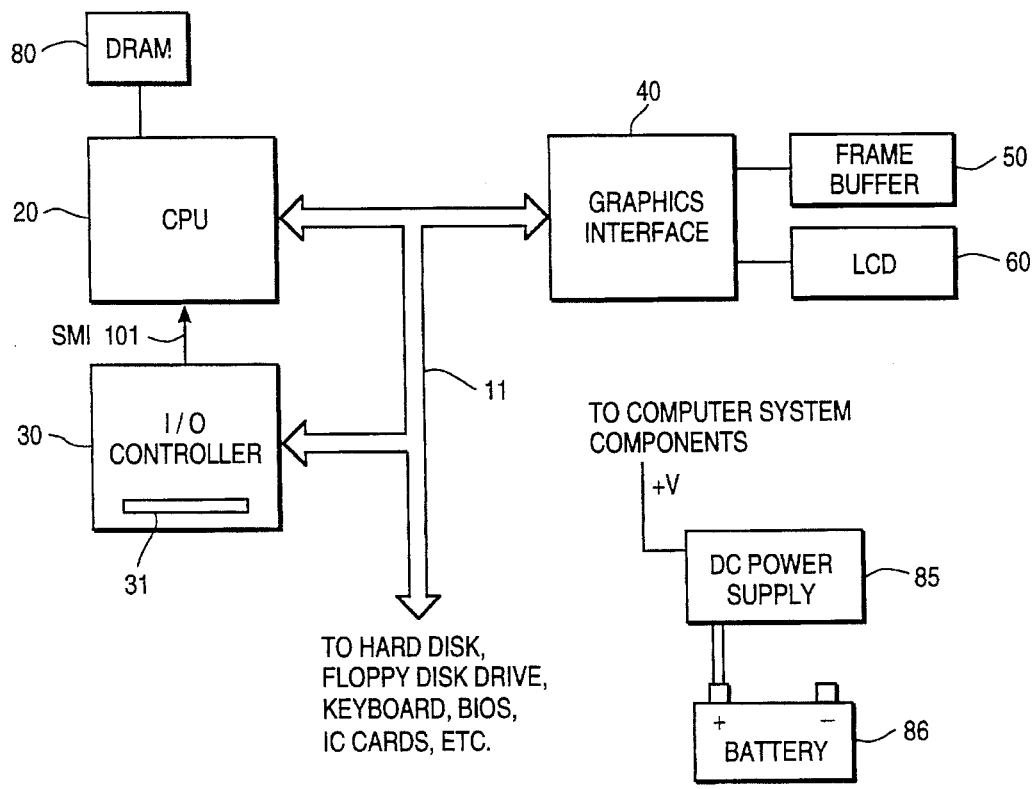
FIG_2

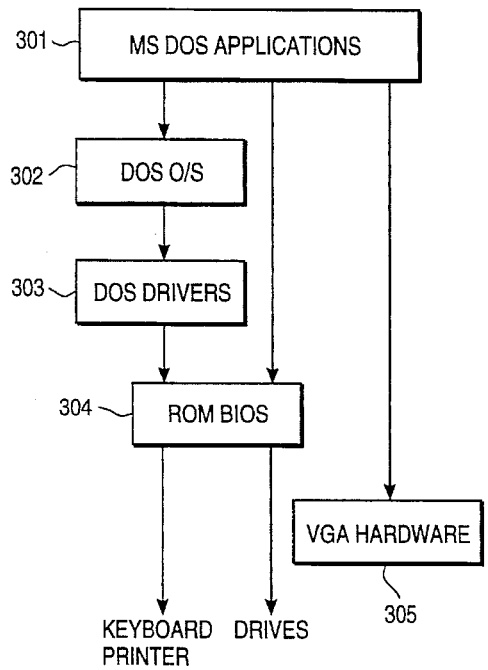
FIG_3A
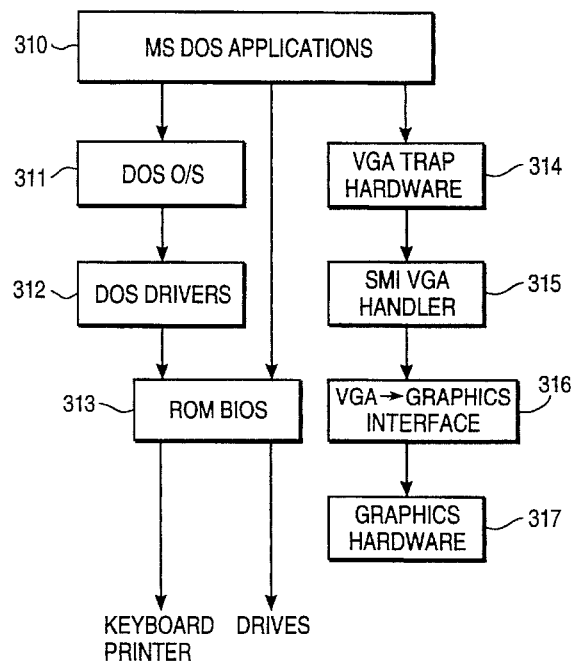
FIG_3B
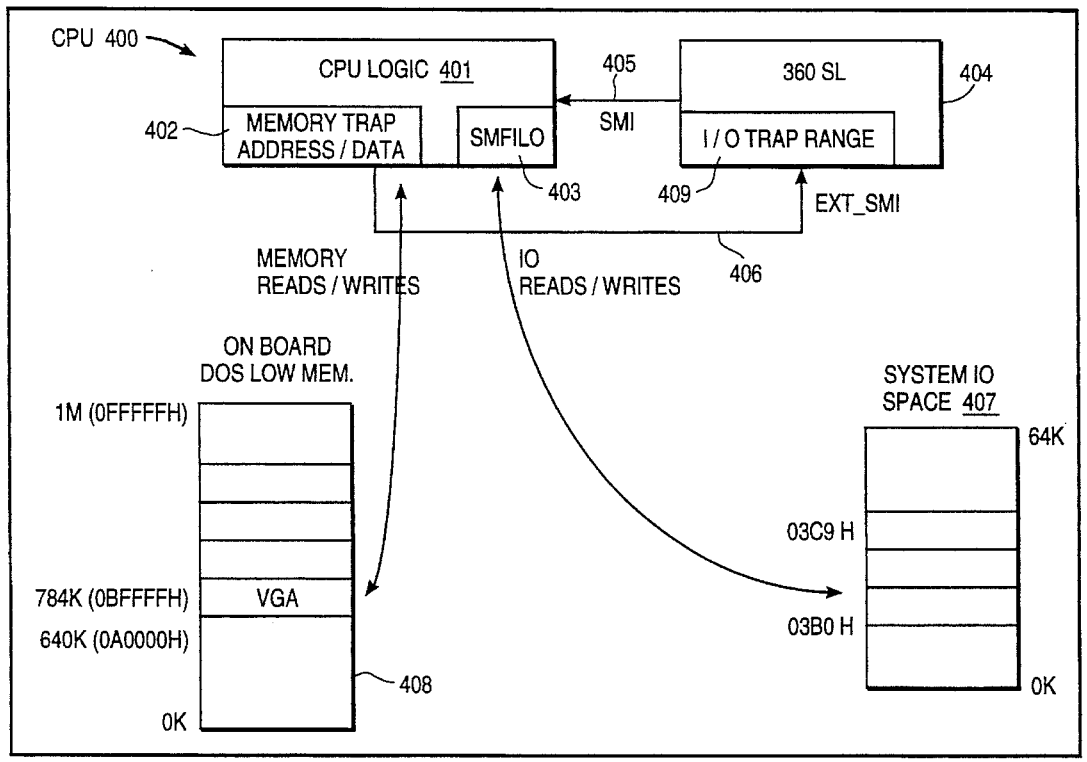
FIG_4

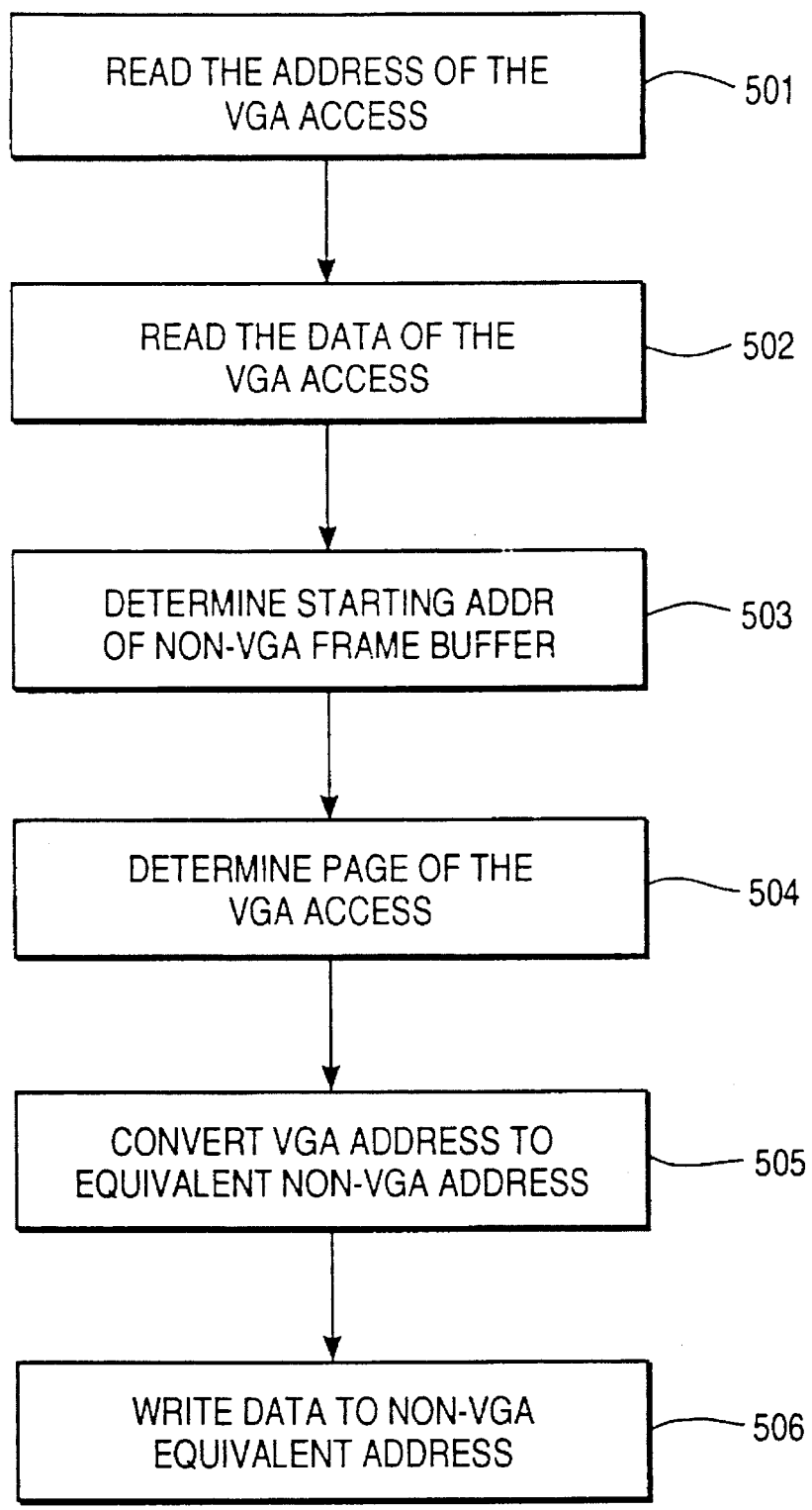
FIG_5

METHOD AND APPARATUS FOR EMULATING CIRCUITRY IN A COMPUTER SYSTEM USING A SYSTEM MANAGEMENT INTERRUPT

This is a continuation of application Ser. No. 07/987,199, filed Dec. 7, 1992, now abandoned.

FIELD OF THE INVENTION

This invention relates to a computer system; particularly, the present invention relates to the emulation of circuitry in a computer system.

BACKGROUND OF THE INVENTION

In the prior art, there have been a number of output display systems devised for presenting information on a video display terminal (hereinafter "a display"), including those utilized with computer systems based on the microprocessor family manufactured by Intel Corporation. The computers utilizing these microprocessors are usually referred to as personal computers (PCs). As the PC was first introduced by International Business Machines (IBM), it provided an output display on a black and white video monitor having a middle level of resolution. As microprocessors of the PC family improved and became faster and able to handle more memory, the display systems were updated initially to include color at a relatively lower resolution and then to add more shades of color at a higher resolution as the technology advanced. Some of these display systems are better known as Hercules, CGA, and EGA. Each of these display systems establish a different set of display system interface standards. More recently, a display system which is called a Video Graphics Adapter (VGA) system has been used throughout the industry.

Due to the proliferation of different output display systems in the PC market, it has been necessary for those wishing to operate application programs that are designed for one particular output display system to ensure that the particular display system utilized by the computer system is capable of providing output for that application program. For example, if a program were written to be displayed on a CGA output display system, then it is necessary that the computer system include an output display system capable of displaying programs written for the CGA display system. On the other hand, if a program were written for display on the EGA output display system, then it is necessary that the computer system include output circuitry adapted to an EGA output display. The non-compatibility between the output display systems derives from differences in the output signals generated which operate at different synchronization frequencies and provide different patterns of pixels to the output display.

Today with the increased availability of large color high resolution display monitors, many personal computer users have begun to use those monitors with their personal computer systems. As is usually the case, such monitors are used only for certain limited application programs while other application programs require that the system include another output display system (e.g., a VGA display). Therefore, it is desirable to provide a computer system having a display system that is compatible with multiple application programs that require different display interfaces.

Due to the inherent problems of VGA, such as performance and resolution, new graphics hardware interfaces and display systems exist today which allow the user of a graphics application to obtain all of the performance and resolution that is required. However, if the user desires the use of an older application (e.g., such as a word processor or spread sheet) which only understands a VGA interface, the older applications will not function properly on new graphics interface. Due to the large amount of financial resources expended on the development of software, there is a desire to provide a computer system which is capable of running applications which are designed for one graphics interface, such as VGA, and those which are designed for another graphics interface, including those of higher resolution and better performance.

One prior art method to combat the compatibility problem between the multiple graphics interfaces available in the PC market is a dual frame buffer system, in which the computer system has one hardware graphics interface for VGA-based applications and another hardware graphics interface for a second type of graphics system. Thus, a frame buffer exists for each type of graphics interface. When a VGA application runs, the VGA hardware of the interface is used, while if another application is executed, the graphics interface for the other graphics subsystem is used. The problem with such an approach is the cost. By duplicating the hardware, the cost is nearly doubled. Furthermore, the use of two sets of hardware requires more space on an integrated circuit and the printed circuit board, where space is at a premium. Likewise, the number of slots available in the computer system are at a premium in the PC environment. Therefore, it is a desire to provide a graphics system which can support VGA-based applications and a new-higher resolution graphics interface for other applications.

The functions performed by circuitry and other programs used in conjunction with a computer system have been emulated by computer systems in the past. Furthermore, software emulation of the VGA is not new to the PC industry. Many text-based applications are supported by the basis input/output system (BIOS) for emulation. Windows™ currently performs VGA emulation in software and runs all of the text-based VGA applications. Microsoft Windows™, however, cannot emulate graphics VGA applications because most of these applications directly write to the VGA hardware (e.g., registers).

As will be shown, the present invention provides software VGA emulation in both text and graphics modes on a graphics interface other then that of VGA. By performing emulation of the unavailable hardware, the present invention eliminates the need for a dual frame buffer system. Therefore, the present invention allows VGA-based applications to generate output which may be displayed on other high resolution graphics systems.

SUMMARY OF THE INVENTION

A method and apparatus for emulating circuitry in a computer system is described. The method and apparatus includes a method and apparatus for determining when the circuitry is to be accessed. Furthermore, in the currently preferred embodiment, the present invention includes a method and apparatus for trapping the address and data of the access. The present invention also includes a method and apparatus for generating an interrupt transparent to the application and to the personal computer operating system indicating to the computer system that the circuitry is being accessed. The present invention also includes a method and apparatus for handling the interrupt and emulating the function of the circuitry. In the currently preferred embodiment, the method and apparatus for emulating comprises a software routine.

In the currently preferred embodiment, the present invention whose method and apparatus for emulating VGA graphics in software transparent to the graphics application that is running.

BRIEF DESCRIPTION OF THE DRAWINGS

The present invention will be understood more fully from the detailed description given below and from the accompanying drawings of the preferred embodiments of the invention, which, however, should not be taken to limit the invention to the specific embodiments, but are for explanation and understanding only.

FIG. 1 illustrates the operation of the present invention.

FIG. 2 is a block diagram of the computer system of the currently preferred embodiment of the present invention.

FIG. 3A and 3B, illustrates the method of performing software emulation of the VGA according to the present invention.

FIG. 4 illustrates the memory and I/O trapping mechanism for the software VGA emulation of the present invention.

FIG. 5 is a flow chart of one example of the software emulation performed by the present invention.

DETAILED DESCRIPTION OF THE INVENTION

A method and apparatus for emulating circuitry in a computer system is described. In the following description, numerous specific details are set forth, such as specific graphics interfaces, specific register types, specific memory ranges, etc., in order to provide a thorough understanding of the present invention. It will be obvious, however, to one skilled in the art that the present invention may be practiced without these specific details. In other instances, well-known structures and devices are shown in block diagram form, rather than in detail in order to avoid unnecessarily obscuring the present invention.

Overview of the Present Invention

The present invention is advantageously employed in a computer system optimized for applications with compact size. Such applications particularly include small battery-powered personal computers of the types commonly referred to as laptops and notebooks. One preferred embodiment of such a computer system is briefly described below; however, it is understood that the present invention is not limited to this particular computer system design and may be incorporated into virtually processor-based system design.

The present invention provides a method and apparatus for allowing a computer system to accommodate a non-standard (i.e., non-understood) hardware where an application or operating system requires the use of a particular circuit, interface, or operational logic which is not in the computer system. The present invention allows the particular circuitry, interface, or operational logic to be emulated, such that the application attempting to utilize or access the particular circuitry, interface, or operational logic to perform a specific function can have the function performed, even though the circuitry does not exist in the computer system. For instance, in the case of the currently preferred embodiment, the present invention allows an application which is designed or configured to operate with a particular interface circuit configuration to be able to utilize alternative circuitries or configurations in the computer system to attain the same result. For example, in the case of graphic applications which understand a particular graphics interface, such as VGA, the present invention allows the application to provide graphics information on a graphics interface other than VGA. Therefore, the present invention allows applications to use circuitries or interfaces to which they are not configured or to which they do no understand by emulating the circuitries and interfaces that are understood.

The operation of the present invention is described in tile flow chart of FIG. 1. Referring to FIG. 1, application 101 is shown generating an access to the particular circuitry or interface. For example, in the case of an application which understands the VGA interface, the application 101 will be shown producing a VGA access (e.g., a read or a write to VGA display circuitry). The access could represent a read or write to the circuitry or an indication to the circuitry in order to invoke the occurrence of some event or the performance of some function.

In response to the access generated by application 101, the computer system of the present invention generates an interrupt 102. The interrupt generated is a system management interrupt (SMI) which is transparent to application 101. In the currently preferred embodiment, SMI interrupt 102 is transparent to all applications. The transparent system management interrupt is described in U.S. Pat. No. 5,175,853, entitled "Transparent System Interrupt", which is assigned to the assignee of the present invention. Therefore, when application 101 attempts to access circuitry does not exist in the computer system (and which is to be emulated), SMI interrupt 102 is generated transparently to application 101.

Upon the generation of SMI interrupt 102, an SMI handler 103 in the computer system addresses the interrupt. In the currently preferred embodiment, SMI handler 103 determines the source of SMI interrupt 102 and provides the appropriate routine to respond to the interrupt. In the currently preferred embodiment, SMI handler 103 utilizes a routine which emulates or converts the access to one which can be accommodated or carried out by the hardware and/or software currently in the computer system. In other words, an access to circuitry which does not exist is converted to an access which can be performed by the current system. In the currently preferred embodiment, SMI handler 103 invokes a software routine to convert or emulate the circuitry which is not present in the system, such that the original access can be satisfied.

Where SMI handler 103 performs emulation on a particular access by converting the access to one which the circuit hardware and software understand, the routine must be fetched from memory. To preserve the access for conversion, the access may be latched or trapped into hardware. If the access comprises data and an address, both are latched, such that the access may be translated when the emulation routine is ready. In the currently preferred embodiment, the trapping of an access occurs in response to SMI interrupt 102 being generated.

In the currently preferred embodiment, conversion emulation 104 is a software routine that is able to convert the access to one which is recognizable by the current system logic and hardware. For instance, in the case of an application which understands the VGA interface, the software conversion/emulation 104 routine would translate the VGA access to one which the current system graphics interface would be able to understand. In this manner, a graphics application, which is designed to produce graphics for a VGA-based display system, can generate graphics for any graphics hardware.

After the conversion/emulation 104 is complete, the translated or converted access is sent on to the current hardware 105. Thus, as far as application 101 is concerned, the original access was completed. However, the original access is actually emulated or converted to one in which the actual system hardware is able to understand, and thus, the access was completed to the actual system hardware.

Other hardware could be emulated by the present invention. In other words, the present invention is not limited to its currently preferred embodiment of the software VGA emulation of a graphics interface. The present invention is applicable to a variety of applications. For instance, the present invention can be utilized to allow access from applications to Input/Output (I/O) devices by emulating their interfaces. For instance, where an application is designed to access a hard disk through a Small Computer System Interface (SCSI), but only a parallel part exists to access the hard disk, the present invention is able to receive the access to the SCSI and convert it to one which the parallel port is capable of understanding. Specifically, the present invention would generate an interrupt which is transparent to the application which attempted the access to the SCSI port, causing the access to be trapped. Then the access would be translated. As far as the application is concerned, the access occurred to the SCSI hard disk. However, in actuality, the access was completed to the hard disk through the parallel port. Thus, the present invention provides the ability to emulate circuitry, interfaces, and operational logic transparent to the application that attempts to access it.

The Currently Preferred Embodiment of the Present Invention

One application of the present invention is to provide VGA software emulation, such that applications (e.g., DOS-based application) which are configured to use a VGA interface (i.e., access VGA hardware, according to a standard VGA interface) could be utilized by computer systems which employ graphics interfaces which is not VGA-based.

FIG. 2 is a block diagram of the computer system of the present invention. Referring to FIG. 2, a preferred embodiment of the computer system 10 of the present invention is shown. In the preferred embodiment, computer system 10 includes a 486SL™ microprocessor manufactured by Intel Corporation, of Santa Clara, Calif., the assignee of this invention. Such computer system is compatible with the IBM PCAT™ Personal Computer.

System 10 comprises three main processor components, designated central processing unit (CPU) 20, input/output (I/O) controller 30 and graphics circuitry 40 coupled to interface bus 11 which communicates information between the components. The combination of CPU 20 and I/O controller 30 without the improvement disclosed herein are available from Intel Corporation under a product designation of 486SL™ Microprocessor SuperSet.

CPU 20 is an expanded central processing unit including a CPU, a memory controller, a cache controller, bus control logic and line buffers. CPU is coupled to receive a SMI interrupt 101 which is a transparent system interrupt. In the currently preferred embodiment, SMI interrupt 101 is received by CPU 20 on a specifically designated hardware pin. CPU 20 enters system management mode (SMM) upon receipt of SMI interrupt 101. In SMM, SMI interrupt 101 is handled using an interrupt servicing routine according to the present invention. A system memory 80 is also coupled to CPU 20. System memory 80 substantially comprises Dynamic Random Access Memory (DRAM) devices.

I/O controller 30 is a single chip input/output (I/O) unit comprising parallel ports, dual serial ports, real-time clock unit, dual programmable interrupt controller, a power management module, dual programmable timers, dual DMA controllers, a memory mapper and I/O buffers. I/O controller 30 also contains a register 31 which is set according to a source of SMI interrupt 101 during the operation of the computer system. By accessing register 31, the source of SMI interrupt 101 can be obtained.

The SMI interrupt 101 is activated by the occurrence of a hardware event. Such a hardware event may be a battery low condition, the expiration of a time out timer, or the activation of a button on the computer. In the present invention, SMI interrupt 101 is generated in response to an access to VGA circuitry (and which is going to be emulated) i.e., a VGA access. Therefore, in response to such an event, I/O controller 30 generates SMI signal 101.

The system management mode (SMM) interrupt handler in CPU 20 handles SMI signal 101. The SMM handler examines I/O controller 30 (e.g., examining storage and other well-known circuitry) to determine the source of SMI interrupt 101. In the currently preferred embodiment, the SMM handler examines register 31. If the source of SMI interrupt 101 is a VGA access, the SMM handler undertakes the necessary actions (i.e., runs the, appropriate routine) to have the VGA interface emulated, such that the access can be used with the existing graphics interface circuitry.

Graphics interface 40 is a single chip graphics interface comprising a graphics controller and a video memory controller. A flat handle display 60 is also coupled to graphics adapter 40. An oscillator (not shown) for refreshing video frame buffer (i.e., video memory). Frame buffer 50 is also coupled to graphics adapter 40. In the currently preferred embodiment, frame buffer 50 substantially comprises of DRAM devices. Also in the currently preferred embodiment, frame buffer 50 is a linear frame buffer.

All the subsystems are coupled to and communicate with one another and with other system components (such as expansion slots, keyboard slots, keyboard controller, disk controller, etc.) via interface bus 11. In one embodiment, bus 11 is an AT compatible bus. Also coupled to bus 11 in the computer system of the currently preferred embodiment of the present invention are a hard disk, floppy disk drive, keyboard, basic input/output system (BIOS) controller and integrated circuit (IC) cards, all of which are not shown to avoid obscuring the present invention.

Computer system 10 is also capable of including a portable power supply 85 coupled with battery 86 to power computer system 10. Power supply 85 is coupled to supply power to the various components of computer system 10.

FIGS. 3A and 3B illustrate a flow chart of VGA software emulation according to the present invention. Referring to FIG. 3A, in the prior art, the DOS application 301 through the operating system (O/S) 302, the drivers 303 and the BIOS 304 controls the keyboard, printer and the drives. However, when an application generates a VGA access, the access is directly output to the VGA hardware 305. VGA hardware 305 controls the graphics interface and monitor to produce the graphic output display.

FIG. 3B shows the operation of the present invention in the DOS environment. As in the prior art, the application 310, via the operating system O/S 311, drivers 312 and BIOS 313, controls the keyboard, the printer, and the drives. However, upon the occurrence of a VGA access, hardware in the computer system traps the VGA access 314. In the currently preferred embodiment, both the address and data of the VGA access are trapped. The trapping of the VGA hardware results when the address of the access is within the memory range defined as the VGA address range in the system memory. In the currently preferred embodiment, the computer system of the present invention identifies a VGA access according to the address associated with the access.

When an access occurs, the present invention generates the SMI interrupt causing the trapping of the address and data of the access. The SMI VGA handler 314 determines the source of the SMI interrupt. Upon determining that the source of the SMI interrupt was a VGA access, the SMI VGA handler 314 causes the execution of an emulation routine. In the currently preferred embodiment, the emulation routine is stored in the system memory space reserved for the use of the system management. The emulation routine translates the VGA access to a graphics access that is recognizable by the current graphics interface and hardware being used in the computer system.

After translating the VGA access to an access that is understood by the current graphics hardware in the system, the translated access is sent to the hardware for display (317). Thus, in the present invention, the VGA access is interrupted in the middle before it reaches any VGA hardware. Transparent to the application that generated the VGA access, the VGA access is emulated to operate with the current graphics hardware.

FIG. 4 illustrates the memory and I/O trapping mechanism for the software VGA emulation of the present invention. Referring to FIG. 4, microprocessor 400 is shown having CPU logic 401, memory address trap hardware 402 and system management first-in/last out (SMFILO) register space 403. I/O controller chip 404 is shown coupled to microprocessor 400 via SMI interrupt 405. I/O controller 404 includes I/O trap hardware 409. Microprocessor 400 is also shown coupled to I/O controller chip 404 via the external SMI (EXT_SMI) interrupt 406. The on-board memory 408 and the system IO space 407 are also shown in FIG. 4. In the currently preferred embodiment, the on-board memory 408 ranges from 0 to 1M (0FFFFFH). In the currently preferred embodiment, the system I/O space 407 comprises of 64K of memory.

In the currently preferred embodiment, a memory address range is set up for VGA accesses in on-board memory 408 and an I/O memory range is set up for I/O VGA accesses in system IO space 407. In the currently preferred embodiment, the memory address range associated with the VGA is typically A0000-BFFFF hex and the I/O address range associated with the VGA is from 03B0-03C9 hex. If at any time, a bus cycle occurs with an address which is within either the memory address or I/O address range reserved for the VGA hardware in the present invention, an SMI interrupt is generated.

When CPU logic 401 is executing an application which is designed to operate with a VGA interface, accesses to memory or I/O may occur. In the currently preferred embodiment, these accesses could either be reads or writes. In the currently preferred embodiment, if during the course of running a graphics application, the graphics application attempts to access the on-board memory 408 between 640K (0A0000H), and 784K (0BFFFFH), an external SMI signal, EXT_SMI 406, is generated from CPU logic 401 to I/O controller 404. In response to EXT_SMI 406, I/O controller 404 generates SMI interrupt 405 to CPU logic 401. In response to SMI interrupt 405, the memory address trap hardware 402 causes the address and data of the memory access to be latched. The SMM handler in CPU logic 401 runs a software emulation (i.e., translation) routine which translates the access into an access which the current graphics hardware is capable of recognizing and understanding. In other words, the SMM handler runs a routine which emulates the VGA memory interface. After the translation of the VGA access occurs, the SMM handler returns to the application, such that the emulation occurred transparently to the application which generated the access.

When running the application, if the application being executed by the CPU logic 401 attempts to access the VGA I/O space from 03B0-03C9 Hex in the system I/O space 407, I/O controller 404 generates SMI interrupt 405 to CPU logic 401. The generation of SMI interrupt 405 causes I/O trap logic 408 to trap the address and data corresponding to the I/O VGA access. The SMM handler of CPU logic 401 upon receiving SMI interrupt 405 queries I/O controller 404 to determine the source of SMI interrupt 405. Upon determining that the source of SMI interrupt 405 was an access to the VGA I/O memory space (i.e., was a VGA I/O access), the SMM handler emulates the I/O access.

in the currently preferred embodiment, VGA applications use I/O accesses to place the VGA hardware into certain modes. In other words, I/O accesses are utilized by a VGA interface controller to initialize the VGA hardware to a particular operating mode. Upon the occurrence of SMI interrupt 405, the address and the data of the I/O access are trapped in the I/O trap range 409. Later, when performing a particular VGA access, if a previous I/O access had been latched, then the desired graphics mode is emulated. In the present invention, the operation is performed by a routine and then the resulting graphics are written back into the address locations that are recognized by the current graphics interface and hardware of the computer system.

Therefore, in the present invention, an application produces an access to VGA memory. The memory and I/O trap hardware latches the address and data associated with the access at any time a specific memory range is indicated. The trapping occurs in response to the generation of SMI interrupt 405. The detection of SMI interrupt 405 also results in the SMM handler of CPU logic 401 performing the proper translation and sending the access to the current graphics hardware of the system.

It should be noted that although the memory address trap hardware 402 is located in the CPU logic 401, it may be located anywhere in the computer system. Likewise, even though the I/O trap range hardware 409 is located in I/O controller 404 in the currently preferred embodiment, the I/O trap range hardware 409 can also be located anywhere in the computer system. Moreover, both the memory trap hardware 402 and I/O trap hardware 409 could be located in CPU logic 401 or I/O controller 404. If both trapping hardwares are located in I/O controller 405, an EXT_SMI signal 406 would not be required. If both are located in microprocessor 400, then both would be required to indicate to I/O controller 404 that an SMI interrupt 405 should be generated.

The trapping hardware utilized in both memory trap address hardware 402 and I/O trapping hardware 409 is well-known in the art and is required to latch both the address and data as soon as CPU logic 401 receives SMI interrupt 405. In one embodiment, the last six IO accesses (i.e., the requisite address, data and control signals) are trapped in the SMFILO 403. In one embodiment, the last six memory accesses (i.e., the requisite address, data and control signals) are trapped in a system management first-in/first-out (SMFIFO) in CPU 401 (not shown to avoid obscuring the present invention). By trapping a predetermined number of past instructions, the present invention compensates for the effects of pipeline processing, wherein by the time SMI interrupt 405 is generated and recognized, other instructions subsequent to the instruction causing SMI interrupt 405 to be generated have been encountered. Therefore, the latching hardware of the present invention must be able to compensate for the delay in generating SMI interrupt 405 so that the address and data of the VGA access which sourced SMI interrupt 405 are not lost.

Note also that on-board system memory 408 is utilized to perform the VGA accesses. Although there is no valid VGA graphics data within the on-board system memory 408, it is important that on-board memory 408 exist for the VGA accesses. An application attempting to perform a VGA access does not need to know that a transparent system interrupt is generated upon an attempted access to that memory space, and therefore, assumes that the read and write access occurred. In the currently preferred embodiment, the on-board memory is required for some applications which perform read-modify-write operations on the VGA frame buffer.

In the present invention, if a full VGA system capable of supporting 256 colors is desired, 256K of on-board system memory would be required. In other words, by using 256K of memory, a total of 256 colors can be displayed. In order to avoid sacrificing 256K of the on-board system memory (which is not even used to store the actual data), the present invention allows the software VGA emulation to use only 64K of memory. Using only 64K, only two colors can be displayed. The use of the on-board 64K bytes of memory eliminates the need for a separate VGA memory. Furthermore, when a VGA emulation mode is turned off, the on-board memory can be rolled over to higher memory areas and be used as part of the system memory. The present invention is not limited to using a 64K bytes of memory for VGA.

Software Emulation in the Present Invention

One example of a routine used for emulating VGA according to the present invention is shown in FIG. 5. Referring to FIG. 5, a flow chart depicts one embodiment of a procedure performed by the SMM handler for emulating a VGA write to a non-VGA linear frame buffer. Upon the occurrence of a VGA write access, the VGA access is converted to a non-VGA write access which is understood by the current graphics hardware in the computer system. Initially, after the SMI interrupt has been generated, causing the memory access to be trapped, the address of the VGA write access is read from the trap register (i.e., hardware) (processing block 501). Then the data being written is read from the trap register (processing block 502). Next, the starting address of the non-VGA frame buffer is ascertained (processing block 503). Once the starting address has been determined, the page of the VGA address in the VGA IO register is determined (processing block 504). The VGA address is converted to the non-VGA equivalent address (processing block 505). The data is then written to the non-VGA equivalent address (processing block 506), thereby concluding the conversion.

A portion of the pseudo code representing the emulation routine of the SMM handler depicted in FIG. 5 is shown below.

---
SMM Handler:

Main
{
—
—
—
IF VGA WRITE Then
{Begin: VGA to nVGA Write Conversion

---
-continued

SMM Handler:

Read VGA Write Address from Trap Register = A;
    Read VGA Write DATA from Trap Register = D;
    Read non-VGA FB Start Memory Address = nA;
    Check the VGA Page in VGA IO Register =
    Px(x=1,2,3,4...);
    Convert VGA Address to non-VGA equivalent Address;
        {nA = (Px * 64K + nA)};
    Write to non-VGA Frame Buffer
        {Write nA = D};
  End: VGA to nVGA Write Conversion
    }
Else
    {Begin:
    —
    —
    —
    End:
    }
—
—
End Main

---

Note: In the currently preferred embodiment, the VGA IO register is stored on a stack or a special buffer.

The software routine of the SMM handler is shown with the body of the routine referred to as the Main program. A portion of the routine tests whether a VGA write access occurred. If a VGA write occurred, the VGA Write to non-VGA frame buffer write conversion portion of the emulation routine begins. First, the VGA memory address is read from the trap register and storing it in the variable labelled A. The data is also read from the trap register and is stored in the variable labelled D. The starting address of the non-VGA frame buffer is read and stored in the variable nA (=new address). The VGA page in the VGA IO register of the VGA write access is checked and stored in the variable Px, where the value of Px is an integer starting from one. The VGA address is then converted to the non-VGA equivalent address for the linear frame buffer according to the equation:

$$nA=(Px*64K+nA),$$

where the 64K corresponds to the size of each page. The data is then written to the location in the non-VGA frame buffer corresponding to the newly converted address, such that the VGA write access is emulated.

FIG. 5, in conjunction with the pseudo code above, is only representative of one of the many emulation routines which are capable of being employed according to the present invention. For instance, another portion of code could be dedicated to the conversion of VGA read accesses. The exact implementation of each emulation routine is dependent on the hardware to be used in the system and the requirements of the application and/or operating system, i.e. what type of hardware, interface, etc. the application and/or operating system understands. In this manner, the present invention allows a computer system to utilize non-standard or non-understood hardware with applications that perform accesses according to a standard hardware, interface or operational logic.

By using a single frame buffer solution with software VGA emulation, a need for two frame buffers is eliminated. Furthermore, the extra silicon and personal computer board space required to provide VGA compatibility in the memory controller is eliminated by the present invention. Also the use of the System Management Interrupt (SMI) allows the software VGA emulation to be transparent to the VGA application and, thus, allows for compatibility between old VGA applications and new graphics subsystem applications.

Whereas many alterations and modifications of the present invention will no doubt become apparent to a person of ordinary skill in the art after having read the foregoing description, it is to be understood that the particular embodiment shown and described by way of illustration is in no way intended to be considered limiting. Therefore, references to details of the preferred embodiment are not intended to limit the scope of the claims which in themselves recite only those features regarded as essential to the invention.

Thus, a method and apparatus for providing circuit emulation in a computer system is described.

I claim:

1. A computer system comprising:

a bus;

at least one memory coupled to the bus, wherein the memory stores data and instructions;

a processor having a plurality of pins coupled to the bus, wherein the processor executes a plurality of instructions that comprise an operating system and at least one application program designed to perform accesses to a first circuitry not present in the computer system, and further wherein the processor asserts a signal on a first of the plurality of pins when an access to the first circuitry occurs;

a second circuitry for performing a function; and a controller coupled to the processor, said controller generating a system management interrupt in response to said signal, wherein the system management interrupt is transparent to said at least one application program and the operating system;

wherein the processor receives the system management interrupt on a second of the plurality of pins, said processor further comprising a first trapping mechanism to trap accesses generated by said at least one application program in response to the system management interrupt, and a system management handler that handles the system management interrupt in an operating environment that underlies the operating system and said at least one application, such that the system management interrupt is handled transparently to the operating system and said at least one application, wherein said system management handler translates accesses generated by said at least one application program that are designated for said first circuitry to be compatible with said second circuitry in response to the system management interrupt, and the system management handler sends converted accesses to the second circuitry for completion and returns to said at least one application while said at least one application program and said operating system are unaware of the first circuitry being emulated by the processor.

2. The system defined in claim 1 wherein an access generated by said at least one application program comprises a read access.

3. The system defined in claim 1 wherein an access generated by said at least one application program comprises a write access.

4. The system defined in claim 1 wherein an access generated by said at least one application program comprises a memory operation.

5. The system defined in claim 1 wherein an access generated by said at least one application program comprises an I/O operation.

6. The system defined in claim 1 wherein the system management handler runs a software routine to translate accesses for completion with the second circuitry.

7. The system defined in claim 1 wherein the controller comprises a second trapping mechanism to trap I/O accesses generated by said at least one application program.

8. The system defined in claim 6 further comprising a system memory reserved for use by the system management handler to store and recall the software routine.

\* \* \* \* \*

UNITED STATES PATENT AND TRADEMARK OFFICE
CERTIFICATE OF CORRECTION

PATENT NO. : 5,590,312
DATED : December 31, 1996
INVENTOR(S) : Suresh K. Marisetty It is certified that error appears in the above-indentified patent and that said Letters Patent is hereby corrected as shown below:

In column 8 at line 17 delete "in" and insert --In--

Signed and Sealed this

Tenth Day of June, 1997

Attest:

BRUCE LEHMAN

Attesting Officer

Commissioner of Patents and Trademarks